Oct. 17, 1967

J. J. PREOTLE ET AL 3,347,728

METHOD FOR FORMING JOINTS IN TUBES

Filed July 29, 1964

INVENTORS
John J. Preotle
Fred I. Payne

J.C. Evans

Their Attorney

Oct. 17, 1967
J. J. PREOTLE ET AL  3,347,728
METHOD FOR FORMING JOINTS IN TUBES
Filed July 29, 1964
2 Sheets-Sheet 2
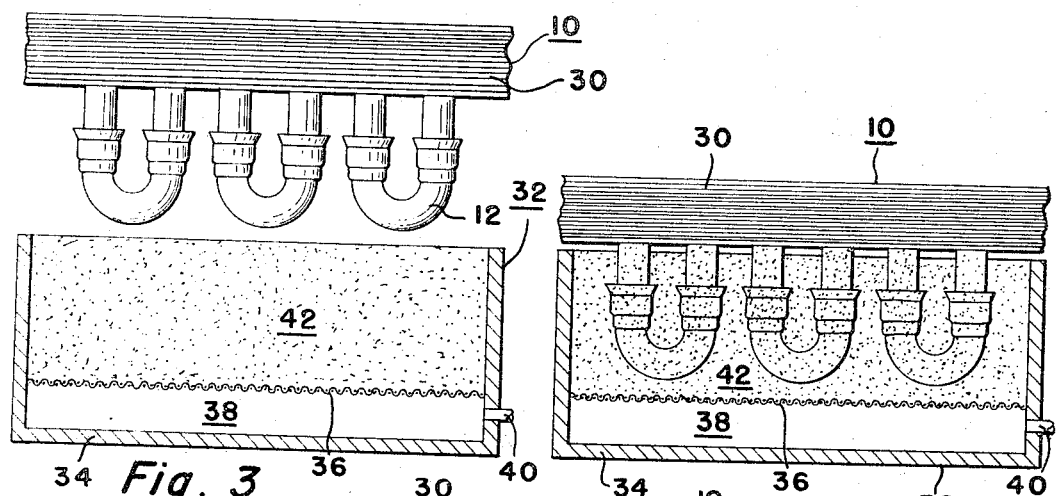
Fig. 3
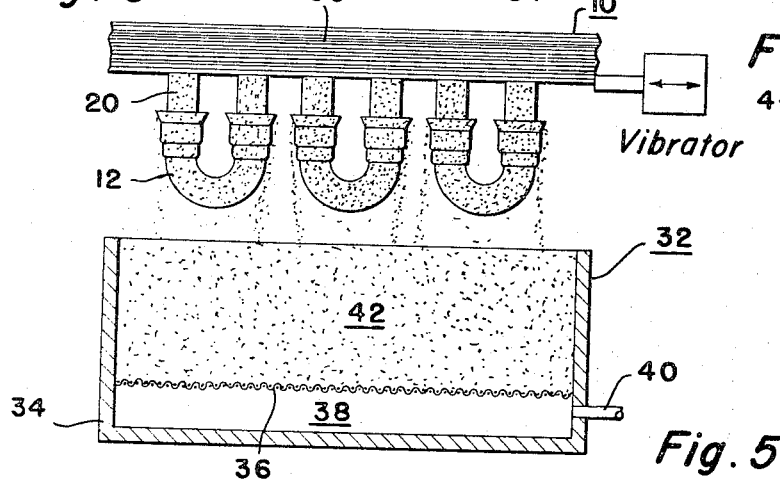
Fig. 4
Fig. 5
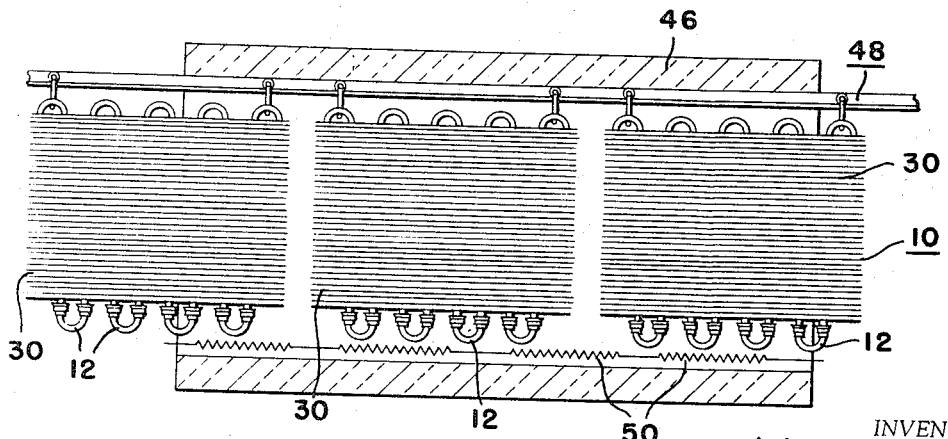
Fig. 6
INVENTORS
John J. Preotle
Fred I. Payne
J.C. Evans
Their Attorney

United States Patent Office

3,347,728
Patented Oct. 17, 1967

3,347,728
METHOD FOR FORMING JOINTS IN TUBES
John J. Preotle and Fred I. Payne, Dayton, Ohio, assignors to General Motors Corporation, Detroit, Mich., a corporation of Delaware
Filed July 29, 1964, Ser. No. 385,908
4 Claims. (Cl. 156—283)

This invention relates to a method for forming joints in tubes and more particularly to a method for forming a fluid tight joint between first and second tube sections, one having a cup end that receives a straight end in the other.

Various methods of manufacturing fluid tight joints in tube assemblies of of the type having a first tube section with a cupped end that receives the straight end of a second tube section have been utilized such as brazing or soldering with metals and bonding by the use of various plastic adhesives such as epoxy resins. While these methods often produce a fluid tight joint suitable for its intended service, they all have certain cost disadvantages especially where large numbers of joints are present in the tube assemblies for example, as found in refrigerant condensers having plural hairpin tube passes or sections serially connected by return bend tube sections.

An object of the present invention, therefore, is to reduce the cost of assembly of a tube assembly having a plurality of joints by using a fluidized bed for filling clearances formed between joined tube sections with sealing agent material.

A further object of the present invention is to improve the manufacture of a tube assembly including first and second tube sections, one of which includes a cupped end portion that receives a straight end on another tube section snugly while providing clearance between the tube sections by locating the assembled tube sections within a fluidized bed of a joint sealing agent so that the cupped ends thereon are arranged to trap a predetermined amount of the sealing agent particles for filling the clearance between the first and second tube sections and then subsequently heating the assembly to melt the powder trapped in the clearance regions therein to effect a fluid tight seal at the joint formed thereby.

Further objects and advantages of the present invention will be apparent from the following description, reference being had to the accompanying drawings wherein a preferred embodiment of the present invention is clearly shown.

In the drawings:

FIGURE 3 is a somewhat diagrammatic view showing a plurality of joints in the assembly of FIGURE 1 prior to being immerced in a fluidized bed of sealing agent particles.

FIGURE 4 is a view of the assembly following immersion in the fluidized bed.

FIGURE 5 is a view of the assembly following the filling step of the method.

Figure 1:
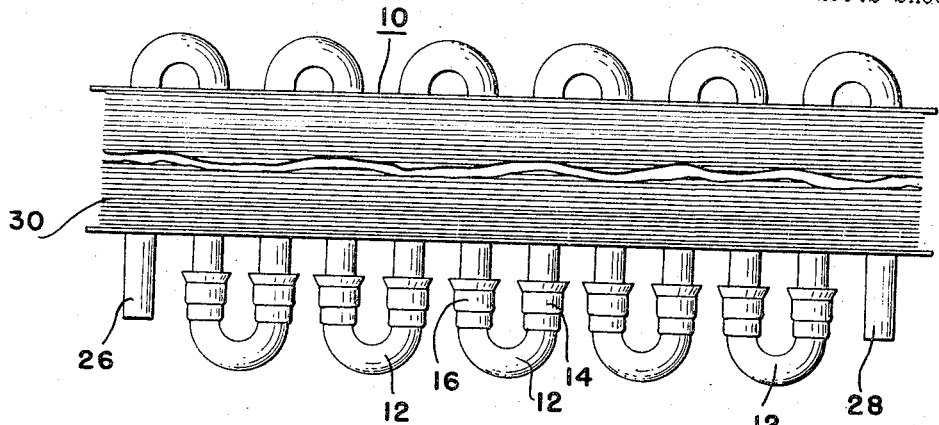
FIGURE 1 is a view in elevation of a fin and tube heat exchanger having joints between first and second tubular sections therein formed by the method of the present invention.
Figure 2:
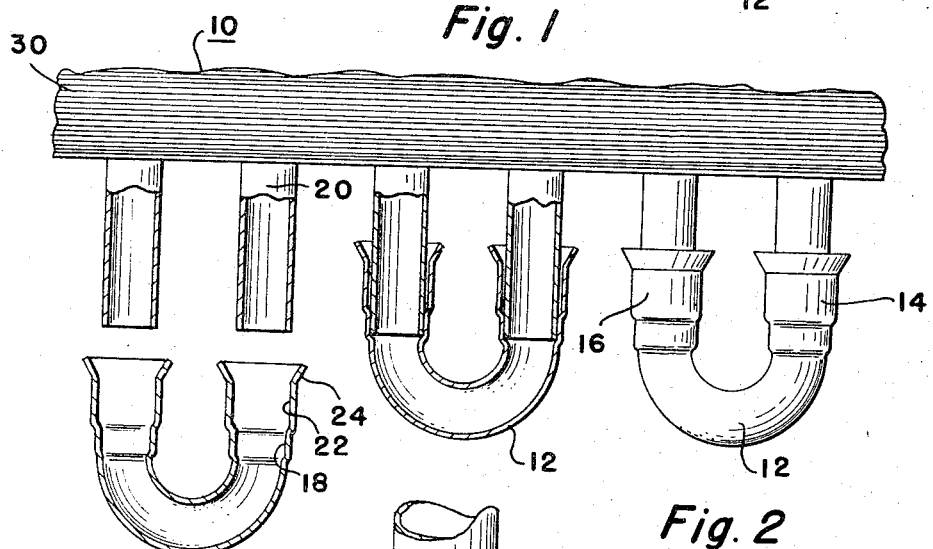
FIGURE 2 is an enlarged fragmentary view, partially in section and partially in elevation, of a portion of the assembly of FIGURE 1 showing an initial step in the method of the present invention.
Figure 7:
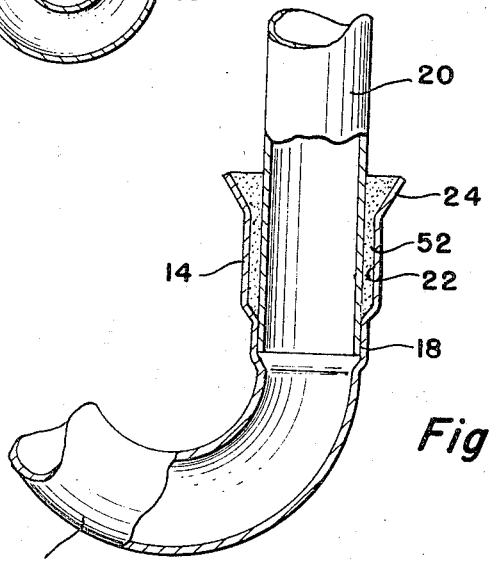

FIGURE 6 is a diagrammatic view of a curing step in the present method wherein the bonding agent is melted to create a fluid tight seal and bond at the joints in the assembly; and FIGURE 7 is an enlarged, fragmentary view in vertical section showing one joint constructed by the method of the present invention. Referring to FIGURE 1, a fin and tube heat exchanger 10 is illustrated which includes a large number of tubular return bends 12 having a generally U-shaped configuration. Each return bend 12 has cup-shaped ends 14, 16 including a small inside diameter opening 18 therein for tightly, supportingly receiving the straight end of a hairpin tube section 20 that is joined to adjacent ones of the return bends 12. Above the small diameter opening 18 in each of the cupped ends 14, 16 is formed a larger diameter opening 22 which is spaced radially outwardly of the outer periphery of the end of tube section 20 that is snugly received within the smaller diameter opening 18. The clearance formed by the larger diameter opening 22 communicates with a radially outwardly flared end 24 on each of the cupped ends 14, 16 as best illustrated in FIGURE 2. The plurality of bent tube sections 20 are joined thus in fluid communication one to the other by the return bends 12 for forming a continuous fluid passageway from an inlet fitting 26 to an outlet fitting fitting 28 in the assembly 10. Fin members 30 are directed transversely of the tube sections 20 and are supportingly received thereon in good heat transfer contact therewith for heat exchange between the fluid passing through the joined tube sections 12, 20 and the environment surrounding the tube section assembly 10.

One problem with assemblies of the type representatively illustrated by the tube assembly 10 has been how to quickly and economically form fluid tight seals between two separate tube sections such as the tube sections 20 and the tubular return bends 12. By practicing the present invention, tube section assemblies having a large number of joints therein as, for example, an arrangement such as is illustrated in FIGURE 1 enables all of the joints to be simultaneously formed by a method that produces sound fluid tight joints throughout the assembly.

More particularly, in the present invention, the process includes providing cupped ends such as those illustrated in FIGURE 2 on one of two tube sections that are to be joined. In the method, preferably the cupped end on one of the tube sections includes a small diameter opening therein in which a straight end on the other of the tube sections tightly fits. Furthermore, it is preferred that the cupped end on the one tube section also includes a larger diameter internal opening that is spaced from the supportingly received and tightly fitted end of the other tube section whereby a clearance region is present in the tube section assembly below the radially outwardly flared tip of the cupped ends.

In the method the tube sections are first joined as illustrated in FIGURE 2, and then the assembly 10 is located above a fluidized bed 32 that includes a receptacle 34 divided by means of a suitable fine mesh screen or other suitable porous member 36 into an inlet plenum 38 that communicates through an inlet tube 40 with a suitable fluid pressure source and an upper region or space 42. Fluid pressure from tube 40 passes into the plenum 38 and across the wire mesh 36 into the space 42 which includes a predetermined amount of powdered material maintained in an extremely turbulent condition by fluid passing through mesh 36. The turbulence in the bed 42 maintains the powder in substantially uniform suspension throughout the volume of the space 42. A recent disclosure showing one way of establishing a fluidized bed suitable for use in the present invention is set forth in the United States Patent No. 2,844,489, to Gemmer, issued July 22, 1958. The improved method of the present invention differs from the Gemmer process in that it uses the bed as a means for filling a clearance to bond and seal a tube joint in articles that are at ambient temperature when dipped into the bed. The elimination of article preheating, as practiced by Gemmer, serves to reduce surface deposition of the powdered agent to effect a substantial material savings.

For purposes of this invention, the details of the fluidized bed are omitted, with it being understood that the characteristics of the bed will vary depending upon the nature of the powdered bonding agent, the size of the receptacle 34 and the porosity of the screen 36 dividing the space 42 from the inlet manifold or plenum 38.

Once aligned in vertical relationship with the bed 32, the assembly 10 is then immersed into the fluidized cloud in the space 42 as illustrated in FIGURE 4 so that the cupped end portions 14, 16 thereon face upwardly. By virtue of this arrangement, the powdered bonding agent within the space 42 has a somewhat reduced velocity immediately in the vicinity of the opened tip of the cupped ends 14,16 due in part to the configuration of these ends. Hence, the powdered particles fall by gravity above the cupped ends 14, 16 to be directed downwardly by the radially outwardly flared tips 24 on the cup-shaped ends 14, 16 into the clearance region surrounding the straight ends of the tube sections 20. Following a predetermined period of time in which the assembly 10 is dipped into the space 42, as shown in FIGURE 4, a sufficient amount of powdered material enters through the opened end of the cup ends 14, 16 to fill both the clearance region at the opening 22 and at the flared tips 24.

Following filling of the clearance region with the powdered material, the assembly 10 is removed from the space 42, as illustrated in FIGURE 5, and in the preferred method is operatively connected to a vibrator assembly 44 for assuring that the clearance region is uniformly filled by the powdered sealing agent particles. Such vibration, if desired, can be carried out while the assembly 10 is located within the space 42.

In the case where unusually high quality leak-proof joints are desired, a subsequent immersion of the previously vibrated assembly 10 can be effected to assure a still further filling of the clearance region by the powdered particles.

Following the filling steps of the improved method, the assembly 10 is supported on a conveyor 49 for movement through an oven structure 46 where the temperature of the assembly 10 is raised to a predetermined temperature by heating elements 50. The powdered particles are thereby melted between the tube sections 20 and 12 in the region of the joint clearance therebetween. Following melting, the sealing material is cured and cooled to produce a fluid sealing plug 52 as seen in FIGURE 7. The plug 52, in the illustrated assembly, adheres to both tube sections 12, 20 in bonded relationship therewith to effect a sound structural interconnection therebetween.

In the case of the illustrated assembly 10, the tube sections 20 and 12 are preferably constructed of aluminum and the sealing agent is an epoxy resin which eliminates galvanic corrosion at the joints formed between the separate tube sections 20, 12. It is understood, of course, that the method of simultaneously forming a large plurality of joints in a plural tube section assembly by filling a clearance therebetween can also be practiced by the use of other suitable sealing agents of powdered particle size such as solder, aluminum, copper and the like.

While the method has been discussed with reference to a plurality of joints connecting many separate tube sections and has its most useful application in such assemblies, it will be appreciated that the method is equally applicable to the process of joining two separate tube sections by forming a cupped end on one of the tube sections and inserting the other of the tube sections therein to form a clearance between the tube sections in the vicinity of the cupped end; then filling the clearance between the tube sections by means of a fluidized bed including a suspended mass of powdered sealing agent particles therein and then melting the particles to create a plug between the tube sections in the vicinity of the clearance therebetween to produce a single joint having good fluid seal and strength properties.

While the embodiment of the present invention as herein disclosed constitutes a preferred form, it is to be understood that other forms might be adapted.

What is claimed is as follows:

1. In a method for forming a plurality of fluid tight joints simultaneously between a plurality of U-shaped tubular return bends and a plurality of generally straight tube sections extending from the ends of the return bend sections wherein the ends of one of said tube sections is cup-shaped to receive the ends of the other of said tube sections snugly while providing clearance therebetween at the outer ends of the cup portions thereon with respect to the tube sections received therein, the steps of, providing a fluidized bed of sealing agent particles, immersing the assembly of the U-shaped tubular sections and the straight tubular sections within said bed with the cupped ends extending upwardly, holding the assemblies in said fluidized bed for a predetermined period of time until the clearance portions of said cup ends are filled with said particles, removing the assembly from said bed, heating the assembly to melt said particles and cooling said particles to produce a fluid tight seal at the joints between the tube sections.

2. In a method for forming a plurality of fluid tight joints simultaneously between a plurality of U-shaped tube sections and a plurality of generally straight tube sections extending therefrom wherein the ends of one of said tube sections is cupped to receive the ends of the other of said tube sections snugly while providing clearance at the outer ends of said cups with respect to the tube sections fitting therein, the steps of, providing a fluidized bed of sealing agent particles, dipping the assembly of the U-shaped tubular sections and straight tubular sections within said bed with the cupped ends thereon facing upwardly, maintaining said cupped ends of said one tube sections in their upwardly facing direction for a predetermined period of time for trapping a portion of the fluidized bed particles within the clearance portions of said cupped ends, vibrating the assembly to uniformly distribute such particles throughout the clearance portions, removing the assembly from said bed while maintaining the cupped portions in their upward direction, heating the assemblies to melt the sealing agent particles in the region of the clearance portion of said cupped end portions, and cooling said sealing agent for producing a tight fluid seal between the tube sections.

3. In a method for joining separate tubular sections wherein one of the tube sections has a cupped end that receives a straight end on the other of the tube sections snugly while providing a clearance at the outer end of the cupped end with respect to the tube section fitting therein, the steps of, producing a fluidized bed of sealing agent particles, immersing the assembled tube sections with the cupped end on the one tube section having the open end thereof facing upwardly, holding the assembly within said fluidized bed for a predetermined time to fill the clearance region between said joined tube sections, removing the joined tube sections from said bed while maintaining the open end of the cupped end in an upward direction, heating the assembly to melt the sealing agent in the clearance region, and cooling the assembly to produce a fluid tight seal between the tube sections.

4. In a method for joining separate tubular sections wherein one of the tube sections has a cupped end to receive a straight end on the other of the tube sections snugly while providing a clearance at the outer end of the cupped end with respect to the tube section fitting therein, the steps of, inserting the straight end tube section into the cupped end of the one tube section into a snug tight fit relationship, maintaining a clearance between the tube sections between the cupped end and the inserted straight end of the other tube section, producing a fluidized bed of sealing agent particles, immersing the assembled tube sections with the cupped end on the one tube section having the open end thereof facing upwardly, holding the assembly within said fluidized bed for a predetermined time to fill the clearance region between said joined tube sections, removing the joined tube sections from said bed while maintaining the open end of the cupped end in an upward direction, heating the assembly to melt the sealing agent in the clearance region, and cooling the assembly to produce a fluid tight seal between the tube sections.

References Cited

UNITED STATES PATENTS

| | | | |
|---|---|---|---|
| 2,890,147 | 6/1959 | Pearson et al. | 156—283 |
| 3,059,697 | 10/1962 | Pitts | 156—330 X |
| 3,063,860 | 11/1962 | Gemmer | 117—21 X |
| 3,090,696 | 5/1963 | Gemmer | 117—21 |
| 3,097,958 | 7/1963 | Morris | 117—20 |
| 3,183,113 | 5/1965 | Gemmer | 117—21 |
| 3,199,491 | 10/1965 | Bader et al. | 117—21 X |
| 3,254,625 | 6/1966 | Armstrong | 117—21 X |
| 3,291,631 | 12/1966 | Smith | 117—21 X |

EARL M. BERGERT, *Primary Examiner.*

H. ANSHER, *Assistant Examiner.*